Patented Nov. 10, 1953

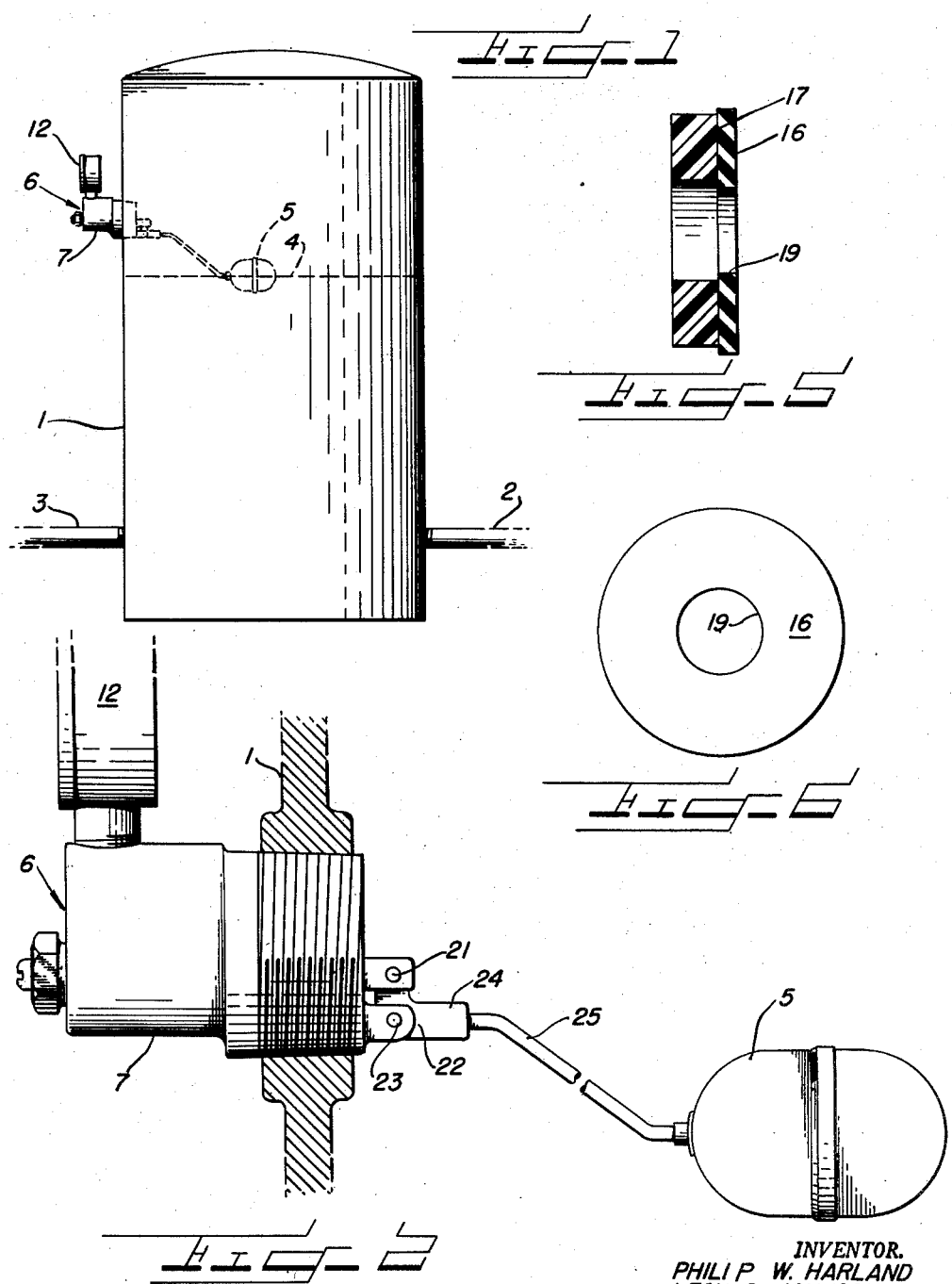

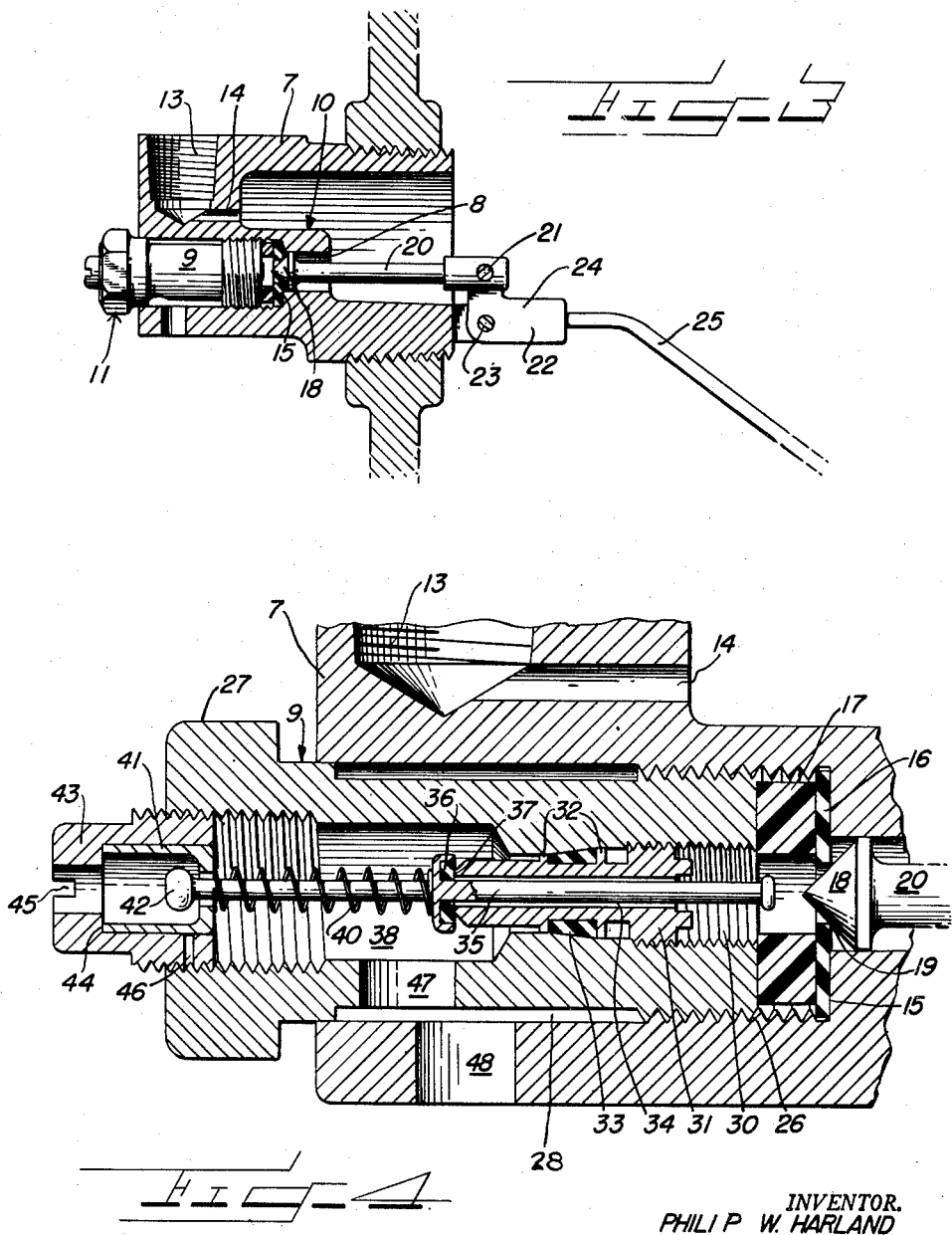

2,658,518

UNITED STATES PATENT OFFICE 2,658,518

AIR RELEASE FOR WATER TANKS

Philip W. Harland, Quakertown, and Leon D. Johnson, Sellersville, Pa., assignors to American Machine and Metals, Inc., New York, N. Y., a corporation of Delaware Application February 17, 1949, Serial No. 76,992

6 Claims. (Cl. 137—210)

This invention relates to devices which release surplus air from water tanks of the type in which air compressed in the top of the tank is utilized to deliver water when the pump has stopped.

The device of this invention is arranged to release air from the tank only after it has been compressed to a predetermined value and then only when the volume of the air thus compressed exceeds a pre-set volume. In the past this result has been accomplished by placing two valves, one valve actuated by a float responsive to the water level, the other valve actuated by a pressure relief spring, in series in a passage leading from the air space of the storage tank to the atmosphere. Such a device is illustrated in the Patent No. 1,849,602, granted to Louis T. Watry on March 15, 1932.

One of the objects of the invention is to build a simpler, more compact unit than has hitherto been available by using standard elements in a novel and simple manner.

A further object of the invention is to make a compact structure housing both a pressure and a water level valve which can be screwed into the wall of the water tank.

Another object of the invention is to provide a release valve comprising a tire valve whose disc is loaded to open under an adjustable pre-set pressure.

Another object of the invention is to provide a pressure relief valve which by being set in an air control plug mounted in the side of the tank is readily removable for inspection.

Another object is to provide an air release assembly which can readily be secured by removing the pressure relief valve and the seal of the valve closed by the float from the assembly without removing the entire assembly from the water tank.

Another object is to provide an air release valve assembly having a special seat construction which permits the valve to seat properly without leakage even though foreign matter or rust has accumulated on the valve face.

In the drawings:

Fig. 1 indicates a water tank equipped with the invention.

Fig. 2 shows the air release in elevation to an enlarged scale.

Fig. 3 shows a vertical section of the device shown in Fig. 2.

Fig. 4 shows a vertical section through the pressure relief assembly shown in Fig. 3 drawn to a still larger scale.

Fig. 5 is a sectional view of the assembly forming the valve seat.

Fig. 6 is an end view of the valve seat assembly viewed from the right in Fig. 5.

In the form of the invention here illustrated, 1 indicates a water storage tank, 2 a pipe through which water is supplied to the storage tank, 3 the pipe leading from the storage tank to the water system served. When water is pumped in through the line 2 which is located near the bottom of the tank, the air in the tank above the inlet is compressed. When the air is compressed to a level 4, the water begins to support a float 5.

The air release assembly is generally indicated as 6 in Fig. 1 and shown in more detail in Fig. 2. The device comprises an outer body or housing 7 which supports the float 5 previously referred to and which contains a passage 8 extending through the body to the atmosphere. In this passage are two valves in series. The first comprises a water level control valve generally indicated at 10 and a pressure relief valve assembly generally indicated at 11 and shown in detail in Fig. 4.

The body 7 or threaded housing also provides a support for the pressure gauge 12 which is screwed into socket 13. This threaded socket is connected with the inside of the tank through a passage 14.

In its preferred form, the mechanism which controls the valve generally indicated at 10, is responsive to the water level and comprises an annular flat shoulder 15 shown in Fig. 4 and a valve seat 19 in an annular rubber washer 16 vulcanized to an annular Bakelite ring 17. The opening in the center of the rubber washer 16 may be smaller than the opening in the Bakelite ring 17 to form an over-hanging lip. This allows the lip to deflect slightly and adapt itself to the valve cone 18. When the body 9 is screwed in place against the Bakelite ring 17 the rubber ring 16 bears against the shoulder and forms the seat of a valve. The valve comprises a conical head 18 mounted on a stem 20. The conical head fits loosely in passage 8 and is guided thereby. When it seats it is free to center itself on the valve seat 19. The other end of the valve stem 20 is supported on pivot 21 carried by a bell crank lever 22, fulcrumed at 23 on ears 24 projecting from the body 7. The bell crank lever carries a bent rod 25 which supports the float 5.

It will be evident, by referring to Fig. 3 that as the water level rises, it will lift the float, the bell crank lever will rotate on the fulcrum and the valve stem 20 will push the valve 18 against its seat 19 preventing the flow of air from the tank through the passage 8.

The pressure relief valve body 9 (Figs. 3, 4) is threaded at 26 and has a hexagonal head 27. This permits applying a wrench to the outside end of the body 9 which projects from the outer body 7 to screw it into the threaded bore of the body until it holds the rubber washer 16 of the valve seat 19 shown in Figs. 4 and 5 tightly in place against shoulder 15. The body 9 is turned down at 28 and has a central bore 30 extending throughout its entire length. The right hand end of the bore as shown in Fig. 4 is threaded to receive a standard tire valve. This tire valve has a valve body or valve core 31 which is threaded to screw into the sides of the passage. It also has flanges 32 which support a rubber ring 33 which is compressed against a conical portion of the passage 30 preventing any flow of air other than through the central passage 34 of the tire valve. The usual tire valve stem or rod 35 passing through this bore carries a valve disc consisting of a flange on the rod supporting a dics 36 of resilient material which seats against the end 37 of the tire valve body or valve core.

The standard tire valve which ordinarily would have the pressure of the air on the tire to the left in portion 38 of the passage 30 is here used in a special manner. Normally the spring 40 which surrounds the valve stem is merely used to assist the air in holding the valve tight. In the manner in which the valve is employed here, the air pressure is at the end 30 and tends to lift the valve disc 36 off its seat. The spring 40 is used as the calibrated pressure loading to hold the valve on its seat. To accomplish this, the usual stamping 41 which normally bears against the head 42 of the valve stem is supported in a cylindrical bore in a threaded pressure adjusting member 43. This bore of the pressure adjusting member has a shoulder 44 against which the stamping 41 is supported. The pressure adjusting member 43 may have a slot 45 for the use of a screw driver to regulate the depth the pressure adjusting member is screwed into the passage 38. The further it is screwed in, the more the spring 40 is compressed and the higher the pressure at which the device will release air. To prevent the pressure adjusting member 43 accidentally changing its position, it may be slotted after being threaded as shown at 46 and the slot slightly compressed.

The operation of the device now will be described: Starting with the tank 1 empty, water is carried into the tank by the pump through pipe 2. Provision is made in well-known manner to carry a small amount of air along with the water through pipe 2. When the water rises in tank 1, as it will if water is fed more rapidly than it is drawn off at line 3, it will compress the air in the tank. The amount of air that is fed in with the water through line 2 is more than is required to cover the absorption of air by the water in the tank so that ultimately the tank would carry an abnormal amount of air. As the air is compressed, it is free to pass through the water level valve 10 because the weight of the float 5 hanging down will keep valve 18 off its seat. The air will attempt to lift the valve disc 36 off its seat, but is resisted by the spring 40. Only when the air in the upper part of the tank has been compressed enough to lift the valve disc off its seat can air pass into the passage 38 and from there through the hole 47 in the side of the body 9 into the annular space 28 and thence out through the opening 48 in body or holder 7 to the atmosphere. Meantime, air passing through passage 14 causes the gauge 12 to register the pressure of the air in the tank. If the pressure at which air is released is not that which it is desired to maintain, the pressure adjusting member 43 may be re-set by inserting a screw driver in the slot 45.

Finally, as the water level rises because of the escape of air under pressure, the rising water level lifts the float 5 which closes the valve 10 by seating valve cone 18 against its seat 19 and prevents any further escape of air.

The pump now continues to further compress the air until the cut-out pressure is reached when the cut-out device which is of a well-known type and not the subject of the invention shunts down the pump. Thereafter, until the pump starts again, the air which at the end of each pump actuation has a given volume and is compressed to a given pressure, will deliver water to the system through line 3 in a uniform manner.

I claim:

1. A pressure release valve assembly comprising a cylindrical body, a cylindrical tire valve core, a passage through said body into which said tire valve core is adapted to be screwed, a shoulder in the passage against which said tire valve bears, a rod passing axially through the valve core, a valve disc carried by the rod and adapted to seat against the end of a valve core, a stamped piece loose on said rod, a coil spring surrounding said rod compressed between said piece and said valve disc, a threaded adjusting nut movable axially in the body relative to said tire valve core, a recess in said adjusting nut supporting said stamped piece and permitting the spring to be compressed against the disc resting against the end of the core to regulate the pressure required to unseat the valve disc.

2. A pressure release valve assembly comprising a cylindrical body, a cylindrical tire valve core, a passage through said body into which said tire valve core is adapted to be screwed, a shoulder in the passage against which said tire valve bears, a rod passing axially through the valve core, a valve disc carried by the rod and adapted to seat against the end of a valve core, a stamped piece loose on said rod, a coil spring surrounding said rod compressed between said piece and said valve disc, a threaded adjusting nut movable axially in the body relative to said tire valve core, a recess in said adjusting nut supporting said stamped piece and permitting the spring to be compressed against the disc resting against the end of the core to regulate the pressure required to unseat the valve disc, flanges at each end of the body, threads on one flange, a passage from that portion of the passage outside of the valve core through the wall of the body between said flanges.

3. A pressure release device comprising a threaded housing adapted to be inserted in a threaded opening in the side wall of a container, a pivotal support carried by the housing, a bell crank supported by said pivotal support, a float having a stem supported by one arm of said bell crank, a passage in said housing, a valve stem attached to the other arm of said bell crank and guided into the housing, an enlarged outer portion of said passage forming a shoulder, a disc forming a valve seat adapted to bear against said shoulder, a cylindrical valve body adapted to be screwed into said enlarged passage against said valve disc, a threaded tapered passage in said body, a valve core adapted to be screwed into said tapered passage, a valve seat on the end of said valve core, a rod passing through the center of said core, a flange on said rod, a disc carried by said flange adapted to bear against said seat, an enlargement of said passage in the body on the outer end threaded for a pressure adjustment nut, a stamped piece loose on said rod, an adjusting nut adapted to be screwed into said valve body and bearing against said washer, a helical compression spring between said piece and said flange on the rod holding said disc against its seat.

4. An air release for a water tank comprising, in combination, a closed water tank, a housing mounted in the side of the water tank, a float in the tank, a conical valve having a stem supported in the housing and adapted to be moved by the float, an annular seat in the housing for said conical valve, a thin flexible disc with a central hole smaller than that through the seat located between the seat and the valve and adapted to conform to the cone of the valve and bend over the edge of the valve seat under the pressure of the valve, a pressure release valve assembly insertable in said housing and serving to hold said valve seat in place and permitting air to escape only when the float has opened the conical valve and the pressure of the air is sufficient to open the relief valve.

5. An adjustable pressure relief valve utilizing a tire valve which comprises, in combination, a body having a passage therethrough, means for mounting a tire check-valve body in said passage in a position which is the reverse of that which it would occupy when used in normal manner as part of a check-valve, said check-valve body having a hole therethrough, a check-valve disc having a stem extending through said hole in said valve body and also extending in the reverse direction from the valve disc, an enlarged portion at the end of the last-named section of said stem, a light coil spring around said stem extension, a reaction disc for the spring movably mounted on said stem, a threaded portion of said passage concentric with the stem of said check-valve, a threaded axially movable plug in said body, means on said plug for engaging the end of said spring reaction piece which permits compression of said spring to the pressure at which the pressure is to lift the relief valve.

6. An adjustable pressure relief valve comprising a body having a central passage threaded at both ends, a cylindrical tire valve core adapted to be screwed into said passage, a rod extending axially through said valve core and having an enlarged end, a valve disc carried by the rod and adapted to close the passage through said valve core, a flanged washer slidable on said rod, a compressed coil spring between said washer and said valve disc, an adjustable nut having a central passage longitudinally movable along the passage and engaging said flanged washer whereby the adjustment of the pressure at which the valve will open can be varied.

PHILIP W. HARLAND.
LEON D. JOHNSON.

References Cited in the file of this patent

UNITED STATES PATENTS

| Number | Name | Date |
|---|---|---|
| 1,885,565 | Terry | Nov. 1, 1932 |
| 1,997,879 | Watry | Apr. 16, 1935 |
| 2,041,579 | Tollefsen | May 19, 1936 |
| 2,210,046 | Shubring | Aug. 6, 1940 |
| 2,328,805 | Holthouse | Sept. 17, 1943 |
| 2,366,520 | Griffith | Jan. 2, 1945 |
| 2,381,640 | Brandstrom | Aug. 7, 1945 |
| 2,520,794 | Brady | Aug. 29, 1950 |